United States Patent
Sill et al.

(10) Patent No.: US 7,738,874 B1
(45) Date of Patent: Jun. 15, 2010

(54) METHOD AND SYSTEM FOR FREQUENCY USAGE

(75) Inventors: Timothy W. Sill, Platte City, MO (US); Frederick L. Fortuna, Overland Park, KS (US); Mark Yarkosky, Overland Park, KS (US); Dae-Sik Oh, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 11/850,275

(22) Filed: Sep. 5, 2007

Related U.S. Application Data

(63) Continuation of application No. 10/274,015, filed on Oct. 17, 2002, now Pat. No. 7,302,266.

(51) Int. Cl.
*H04W 36/00* (2009.01)

(52) U.S. Cl. .................. 455/441; 455/442; 455/447; 455/562.1; 455/67.11; 455/41.2; 370/338; 370/331

(58) Field of Classification Search ......... 455/436–444, 455/450, 423, 67.11, 447, 562.1, 422.1, 41.2; 370/331–333, 328, 338
See application file for complete search history.

(56) References Cited

U.S. PATENT DOCUMENTS

| | | | | |
|---|---|---|---|---|
| 5,140,695 A | * | 8/1992 | Yasuda et al. | 455/450 |
| 5,239,667 A | * | 8/1993 | Kanai | 455/10 |
| 5,345,499 A | * | 9/1994 | Benveniste | 455/449 |
| 5,361,258 A | * | 11/1994 | Arnold et al. | 370/330 |
| 5,396,253 A | * | 3/1995 | Chia | 342/104 |
| 5,396,645 A | * | 3/1995 | Huff | 455/441 |
| 5,787,348 A | * | 7/1998 | Willey et al. | 455/441 |
| 5,884,178 A | * | 3/1999 | Ericsson et al. | 455/441 |
| 5,913,168 A | * | 6/1999 | Moreau et al. | 455/441 |
| 5,956,641 A | * | 9/1999 | Bruckert et al. | 455/442 |
| 5,983,104 A | * | 11/1999 | Wickman et al. | 455/441 |
| 5,990,676 A | * | 11/1999 | Hori | 324/175 |
| 6,014,566 A | | 1/2000 | Owada | |
| 6,212,407 B1 | * | 4/2001 | Hiramatsu | 455/562.1 |
| 6,259,919 B1 | * | 7/2001 | Suonvieri et al. | 455/441 |
| 6,330,446 B1 | * | 12/2001 | Mori | 455/435.2 |
| 6,385,454 B1 | | 5/2002 | Bahl et al. | |
| 6,553,236 B1 | | 4/2003 | Dunko et al. | |
| 6,574,456 B2 | * | 6/2003 | Hamabe | 455/63.3 |
| 6,628,958 B1 | | 9/2003 | Kamel et al. | |
| 6,714,800 B2 | * | 3/2004 | Johnson et al. | 455/561 |
| 6,847,625 B2 | * | 1/2005 | Heinonen et al. | 370/338 |
| 6,947,745 B1 | | 9/2005 | Kido | |
| 7,120,440 B2 | * | 10/2006 | Cho et al. | 455/441 |
| 7,302,266 B1 | | 11/2007 | Sill et al. | |

(Continued)

*Primary Examiner*—Sharad Rampuria

(57) ABSTRACT

A wireless telecommunications network that uses a first frequency spectrum for wireless communications in a plurality of generally contiguous wireless coverage areas also has available a second frequency spectrum for wireless communications in a high-traffic wireless coverage area. Mobile stations in the high-traffic wireless coverage area are classified as either static or dynamic based on determinations of their speeds. The wireless telecommunications network uses the first frequency spectrum for wireless communications with dynamic mobile stations in the high-traffic wireless coverage area and uses the second frequency spectrum for wireless communications with static mobile station in the high-traffic wireless coverage area. The wireless telecommunications network may instruct the mobile stations in the high-traffic coverage area to use the appropriate frequency spectrum.

19 Claims, 5 Drawing Sheets

U.S. PATENT DOCUMENTS

| | | | |
|---|---|---|---|
| 7,420,944 B2 * | 9/2008 | Norris et al. | 370/332 |
| 2002/0111163 A1 | 8/2002 | Hamabe | |
| 2003/0064729 A1 | 4/2003 | Yamashita | |
| 2004/0147267 A1 * | 7/2004 | Hill et al. | 455/456.1 |
| 2004/0203756 A1 | 10/2004 | Lin et al. | |

* cited by examiner

METHOD AND SYSTEM FOR FREQUENCY USAGE

CROSS-REFERENCE TO RELATED APPLICATIONS

This is a continuation of application Ser. No. 10/274,015, filed Oct. 17, 2002, which application is incorporated herein by reference.

BACKGROUND

1. Field of the Invention

The present invention relates to wireless telecommunications and, more particularly, to methods and systems for frequency usage in a wireless telecommunications network.

2. Description of Related Art

As wireless telecommunications have become increasingly popular, wireless telecommunications networks have been increasing their wireless capacity in order to accommodate the increase in wireless traffic. Whether a wireless telecommunications network uses an analog format, such as AMPS, or a digital format, such as TDMA or CDMA, the wireless capacity of the network is typically limited by a number of factors, including the bandwidth of the available frequency spectrum.

For example, as specified in IS-95, a CDMA air interface includes a 1.23 MHz wide downlink band for communications in the forward direction, i.e., towards the mobile station and another 1.23 MHz wide uplink band for communications in the reverse direction, i.e., from the mobile station. The same 1.23 MHz bands may be used in up to 512 wireless coverage areas, such as cells or sectors, without interference, by using a distinct pseudonoise (PN) code offset in each wireless coverage area. Within each wireless coverage area, the downlink band may accommodate up to nine (9) control channels, e.g., a pilot channel, a sync channel, up to seven (7) paging channels, and up to sixty-one (61) traffic channels, identified by distinct Walsh codes.

The uplink band in each wireless coverage area may accommodate up to thirty-two (32) access channels and sixty-two (62) traffic channels, identified by distinct PN codes. Other CDMA specifications, such as IS-2000 may support different channels and different bandwidths. Nonetheless, if all of a wireless coverage area's limited number of traffic channels are being used, that wireless coverage area may be unable to support additional calls. As a result, in high-traffic wireless coverage areas, such as airports, wireless service may be unreliable during times of peak usage.

One approach for adding wireless capacity is to make additional frequency spectrum available to high-traffic wireless coverage areas. However, if the additional frequency spectrum is used only in the high-traffic wireless coverage area, then calls may be dropped when mobile stations using the additional frequency spectrum move to other wireless coverage areas that do not support the additional frequency spectrum. In particular, if a mobile station is engaged in a call on a given frequency and then moves into a wireless coverage area that does not support that frequency, a "hard handoff" process occurs. A hard handoff process is a "break before make" process in which an existing communication link is dropped before a new one is made. Thus, hard handoffs, such as inter-frequency handoffs, often result in dropped calls.

In contrast, CDMA supports a "soft handoff" process for mobile stations that move from one wireless coverage to another using the same frequency. A soft handoff process is a "make before break" process in which a new communication link is made before the existing communication link is dropped. As a result, soft handoffs are much less likely to cause calls to be dropped than hard handoffs.

Accordingly, one approach for minimizing dropped calls when additional frequency spectrum is added to a high-traffic wireless coverage area is to make the additional frequency spectrum available in surrounding wireless coverage areas as well. In this way, a mobile station using the additional frequency spectrum in the high-traffic wireless coverage area may use a soft handoff process to move into an adjoining wireless coverage that supports the additional frequency spectrum. However, adding frequency spectrum to surrounding wireless areas that may not themselves need additional wireless capacity is inefficient and substantially more costly than adding wireless capacity to only the high-traffic wireless coverage areas.

Accordingly, there is a need to increase wireless capacity in high-traffic wireless coverage areas in an efficient manner that minimizes disruptions to wireless service.

SUMMARY

In a first principal aspect, the present invention provides a method of frequency usage in a wireless telecommunications network. The wireless telecommunications network includes a transceiver system that provides a wireless coverage area. The transceiver system is able to use at least a first frequency spectrum and a second frequency spectrum for communications with mobile stations located in its wireless coverage area. In accordance with the method, a speed of a mobile station is determined. If the speed is below a first threshold value, the wireless telecommunications network instructs the mobile station to use the second frequency spectrum. In response, the mobile station uses the second frequency spectrum in the wireless coverage area.

In a second principal aspect, the present invention provides a method of increasing the wireless capacity of at least one wireless coverage area in a wireless telecommunications network that has a plurality of generally contiguous wireless coverage areas. In each of the wireless coverage areas, the wireless telecommunications network uses at least a first downlink frequency band for communicating with mobile stations located therein. In accordance with the method, the wireless telecommunications network uses the first downlink frequency band for communicating with dynamic mobile stations located in the at least one wireless coverage area, and the wireless telecommunications network uses a second downlink frequency band, different from the first downlink frequency hand, for communicating with static mobile stations located in the at least one wireless coverage area.

In a third principal aspect, the present invention provides a system for controlling frequency usage in a wireless telecommunications network. The system comprises a transceiver system for wirelessly communicating with mobile stations located in a wireless coverage area and a controller for controlling the transceiver system. The controller classifies mobile stations as static or dynamic. The transceiver system uses a first frequency spectrum for communications with dynamic mobile stations and a second frequency spectrum for communications with static mobile stations.

DETAILED DESCRIPTION OF EXEMPLARY EMBODIMENTS

1. Exemplary Architecture

Figure 1:
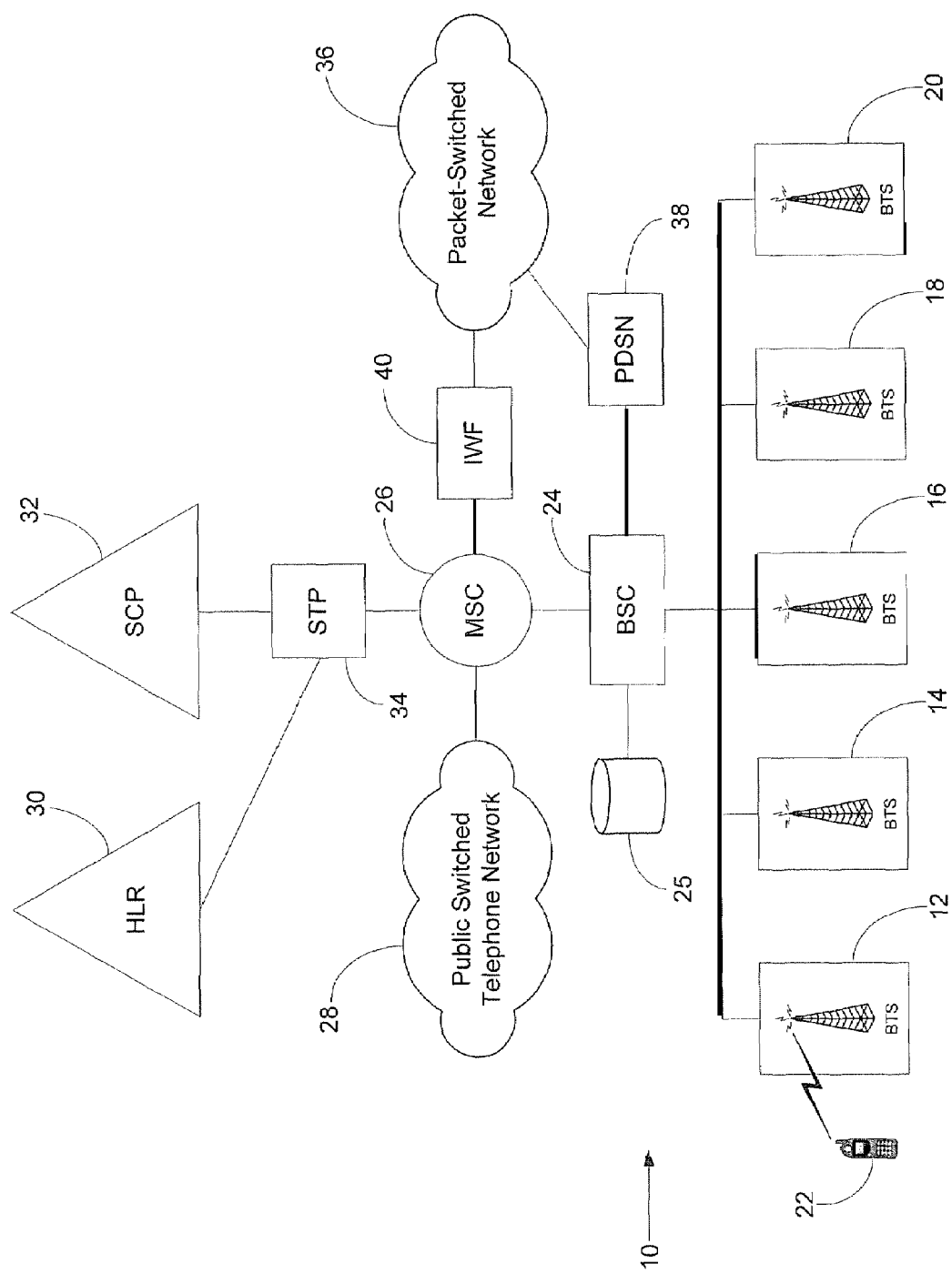
FIG. 1 is a simplified block diagram of a wireless telecommunications network, in accordance with an exemplary embodiment of the present invention.

Referring to the drawings, FIG. 1 is a simplified block diagram of an exemplary wireless telecommunications network 10 in which exemplary embodiments of the present invention may be employed. Wireless telecommunications system 10 includes a plurality of base transceiver stations (BTSs) 12, 14, 16, 18, and 20, each of which provides a wireless coverage area within which the BTS may communicate with one or more mobile stations, such as mobile station 22, over an air interface. Mobile station 22 may be a wireless telephone, a wireless personal digital assistant (PDA), a wirelessly equipped laptop computer, or other such device. The communications between a BTS, such as BTS 12, and mobile station 22 may occur in a digital format, such as CDMA, TDMA, or GSM, or they may occur in an analog format, such as AMPS. Preferably, CDMA is used. Applicable CDMA formats are described, for example, in TIA/EIA/IS-95-B (published Oct. 31, 1998) and in TIA/EIA/IS-2000 Series, Rev. A-2 (published April 2002), which are incorporated herein by reference.

BTSs 12, 14, 16, 18, and 20 may be controlled by a base station controller (BSC) 24. BSC 24, in turn, may include or have access to data storage 25. As described in more detail below, BSC 24 may use data storage 25 to store information for tracking mobile stations, such as mobile station 22. Data storage 25 may include volatile data storage, such as random access memory (RAM), and/or non-volatile data storage, such as read-only memory (ROM), magnetically encoded tape, magnetically encoded disks, or optically encoded disks.

BSC 24 may, in turn, be controlled by a mobile switching center (MSC) 26. MSC 26 is connected to the public switched telephone network (PSTN) 28 and may use a signaling system, such as SS7, to route calls through PSTN 28. MSC 26 may also be able to signal to a home location register (HLR) 30 and to a service control point (SCP) 32. This signaling may occur via one or more signal transfer points (STPs), such as, for example, STP 34. The signaling between MSC 26 and HLR 30 may conform to IS-41 specifications. A recent revision of the IS-41 specifications, ANSI/TIA/EIA-41-D-97, published in December 1997, is incorporated herein by reference. The signaling between MSC 26 and SCP 32 may conform to the specification "Wireless Intelligent Network," TIA/EIA/IS-771, published in July 1999, which is incorporated herein by reference. Other signaling protocols could be used, however. In this way, MSC 26, BSC 24, and BTS 12, for example, may connect incoming calls from PSTN 28, which may originate from landline telephones, mobile stations, or other communication devices, to mobile stations in the wireless coverage area of BTS 12, such as mobile station 22. Similarly, MSC 26, BSC 24, and BTS 12 may connect calls originating from mobile station 22 to their destinations, via PSTN 28.

Although FIG. 1 shows BSC 24 connected to five BTSs, in general, BSC 24 may be connected to a greater or fewer number of BTSs. In addition, although FIG. 1 shows BTSs 12, 14, 16, 18, 20 all connected to the same BSC, in general, these BTSs could be connected to different BSCs. Similarly, although FIG. 1 shows MSC 26 connected to one BSC, in general, MSC 26 may be connected to more than one BSC. Other variations are possible as well.

Mobile station 22 may also be able to access a packet-switched network 36, such as the Internet. For example, mobile station 22 may access packet-switched network 36 for e-mail, wireless web browsing, instant messaging, or "push-to-talk" teleconferencing. To provide access to packet-switched network 36, BSC 24 may include a packet control function (PCF), and a packet data serving node (PDSN) 38 may connect BSC/PCF 24 to packet-switched network 36. The communications between BSC/PCF 24, MSC 26, and PDSN 38 may conform to "third generation" (3G) specifications. Examples of such 3G specifications include "Wireless IP Network Standard," 3GPP2 P.S0001-A, dated Jul. 16, 2001 and "3GPP2 Access Network Interfaces Interoperability Specification," 3GPP2 A.S0001-A, dated June 2001, which are incorporated herein by reference.

In an alternative approach for providing access to packet-switched network 36, MSC 26 may be connected to packet-switched network 36 via an interworking function (IWF) 40. MSC 26 and IWF 40 may allow mobile stations, such as mobile station 22, to access packet-switched network 36 in circuit-switched data (CSD) sessions.

Figure 2:
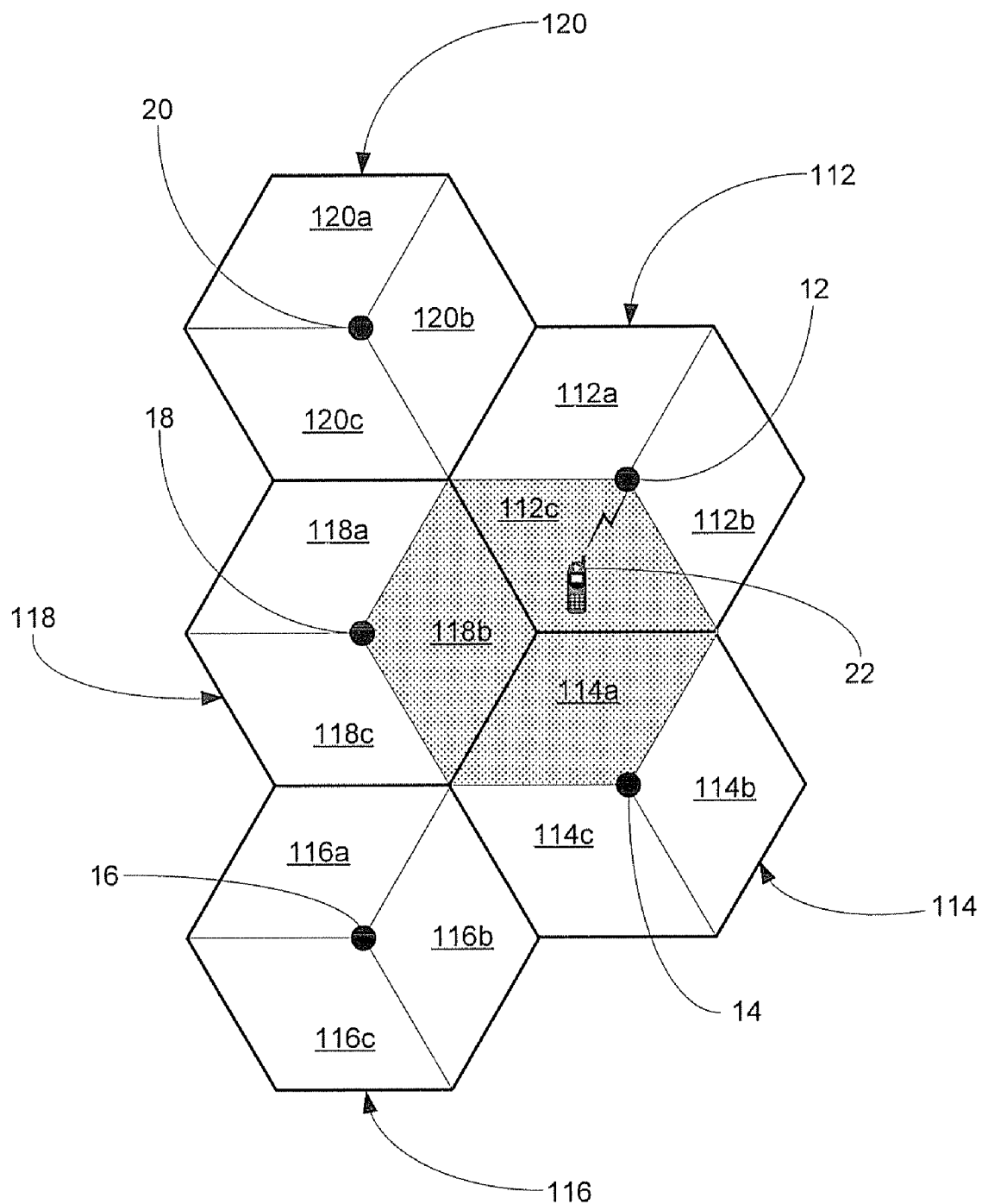
FIG. 2 is a schematic diagram showing the wireless coverage areas provided by the wireless telecommunications network of FIG. 1, in accordance with an exemplary embodiment of the present invention.

FIG. 2 schematically illustrates the wireless coverage areas provided by BTSs 12, 14, 16, 18, and 20 in accordance with an exemplary embodiment. Such wireless coverage areas may include cells and/or sectors. FIG. 2 shows BTSs 12-20 located in cells 112-120, respectively. In addition, in this exemplary embodiment, each BTS provides three sectors in each cell, such as by using directional antennas. Each sector shown in FIG. 2 is identified by the number identifying the cell, with either an "a", "b", or "c" appended thereto. In this way, wireless telecommunications network 10 provides wireless coverage areas 112a through 120c, as shown in FIG. 2.

As will be apparent to those of ordinary skill in the art, FIG. 2 illustrates wireless coverage areas 112a through 120c in only a highly idealized fashion. In practice, the geographic extent of wireless coverage areas 112a through 120c may be very different than shown in FIG. 2. For example, while wireless coverage areas 112a through 120c are generally contiguous, they may overlap to some extent, such that, in many locations, a mobile station can communicate in more than one wireless coverage area. Thus, wireless coverage areas 112a through 120c shown in FIG. 2 are more representative of areas of optimal wireless communication.

Figure 3:
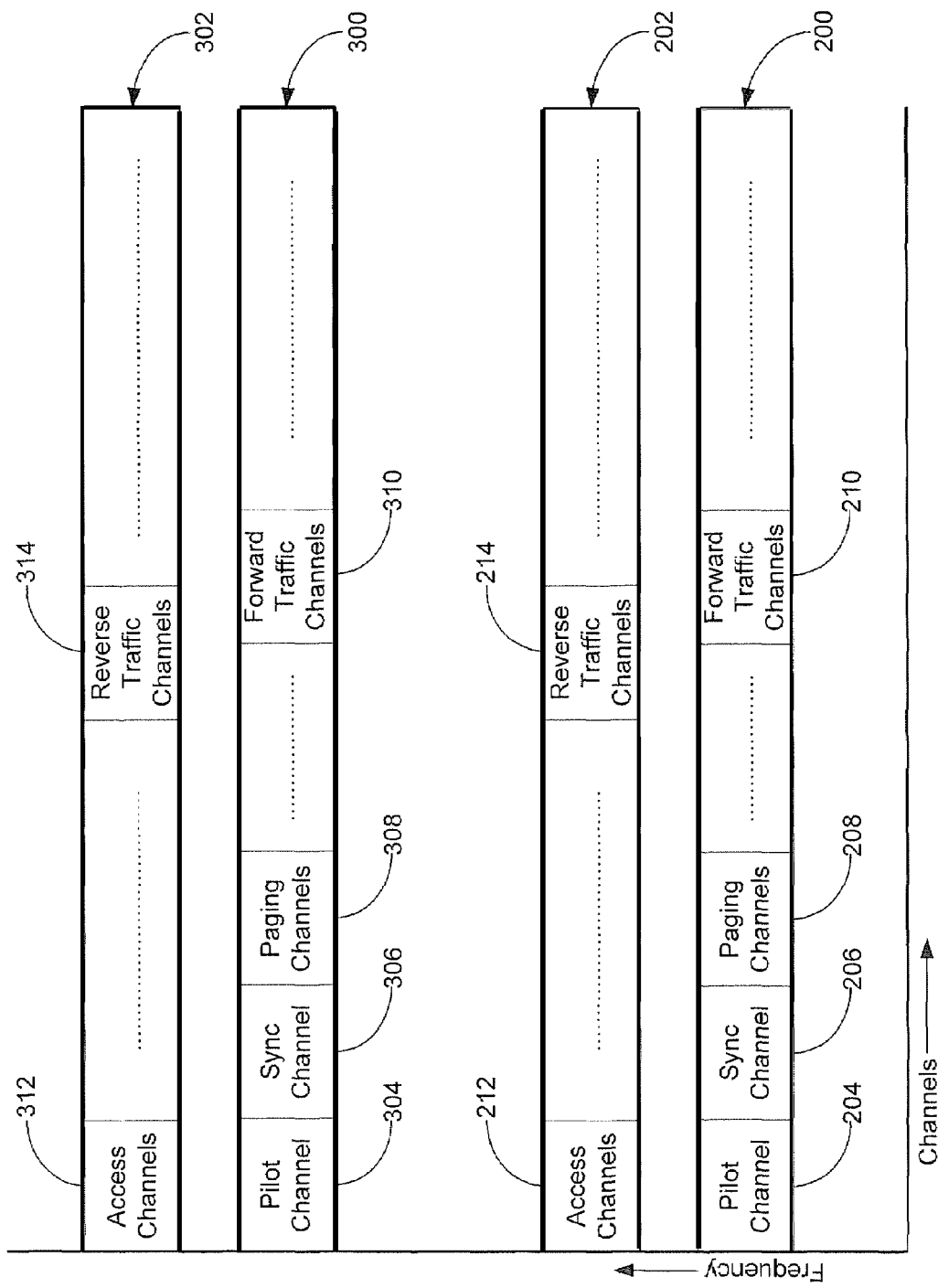
FIG. 3 is a schematic diagram illustrating CDMA channels in a first frequency spectrum and a second frequency spectrum, in accordance with an exemplary embodiment of the present invention.

In the CDMA case, the same frequency spectrum may be used for wireless communications in each of wireless coverage areas 112a through 120c. As FIG. 3 shows schematically, this frequency spectrum may include a downlink frequency band 200 for communications to mobile stations and an uplink frequency band 202 for communications from mobile stations. Frequency bands 200 and 202 have a bandwidth that is a function of how a carrier frequency is modulated. For example, downlink frequency band 200 may have a bandwidth of 1.23 MHz as a result of a downlink frequency carrier being modulated by a PN sequence at a 1.23 MHz chipping rate. Similarly, uplink frequency band 202 may have a bandwidth of 1.23 MHz and include an uplink frequency carrier modulated by a PN sequence at a 1.23 MHz chipping rate. In general, however, frequency bands 200 and 202 may have different bandwidths and may use different modulation schemes. In addition, although frequency bands 200 and 202 may be non-overlapping, as shown in FIG. 3, in some embodiments they may partially or completely overlap.

Downlink frequency band 200 may include a plurality of channels, each identified by a distinct Walsh code or other code. For example, downlink frequency band 200 may include control channels, such as a pilot channel 204, a sync channel 206, and one or more paging channels 208. Downlink frequency band 200 may also include one or more forward traffic channels 210. In order to prevent interference, each of wireless coverage areas 112a through 120c may use a distinct PN code offset for communications in downlink frequency band 200.

Uplink frequency band 202 may include a plurality of channels, each identified by a distinct PN code or other code. For example, uplink frequency band 202 may include one or more access channels 212 and one or more reverse traffic channels 214. In some embodiments, uplink frequency hand 202 may also include other types of channels.

In accordance with the present invention, one or more wireless coverage areas served by wireless telecommunications network 10 may also use a second frequency spectrum for communications with mobile stations. As shown in FIG. 3, the second frequency spectrum may include a downlink frequency band 300 and an uplink frequency band 302 that do not overlap with downlink frequency band 200 and uplink frequency band 202 of the first frequency spectrum. The second frequency spectrum may occupy higher frequencies than the first frequency spectrum, as shown in FIG. 3. Alternatively, the second frequency spectrum may occupy lower frequencies, may be interleaved between the frequency bands of the first frequency spectrum, or may partially overlap the first frequency spectrum.

The channel structure used in the second frequency spectrum is preferably the same or similar to that used in the first frequency spectrum. Thus, downlink channel 300 may include a pilot channel 304, a sync channel 306, one or more paging channels 308, and one or more forward traffic channels 310, with each channel identified by a distinct code. Similarly, uplink channel 302 may include one or more access channels 312 and one or more reverse traffic channels 314, with each channel identified by a distinct code. Alternatively, the second frequency spectrum may use a different channel structure, different bandwidths, and/or different modulation schemes than the first frequency spectrum.

In the example shown in FIG. 2, the second frequency spectrum is available in wireless coverage areas 112c, 114a, and 118b, as indicated by the shading in FIG. 2. It is to be understood that this arrangement is illustrative only. The second frequency spectrum may be available to a greater or fewer number of wireless coverage areas. In addition, although in the example of FIG. 2 the second frequency spectrum is available only in specific sectors, in other embodiments, the second frequency spectrum may be available throughout a cell or cells.

The second frequency spectrum may be made available in wireless coverage areas 112c, 114a, and 118b by modifying BTSs 12, 14, and 18 to use the second frequency spectrum in addition to the first frequency spectrum. Alternatively, BTSs 12, 14, and 18 may include BTSs that use the second frequency spectrum co-located with BTSs that use the first frequency spectrum. Preferably, BTSs 12, 14, and 18 use the same antennas for transmitting and receiving in the second frequency spectrum as they use for transmitting and receiving in the first frequency spectrum.

As described in more detail below, BTSs 12, 14, and 18 may use the second frequency spectrum only for communications with certain mobile stations located in wireless coverage areas, 112c, 114a, and 118b, respectively. In addition, BTSs 12, 14, and 18 may use the second frequency spectrum only at certain times, such as during times of peak usage. In general, each of BTSs 12, 14, and 18 may use the second frequency spectrum at different times and/or under different conditions.

2. Exemplary Operation

Figure 4:
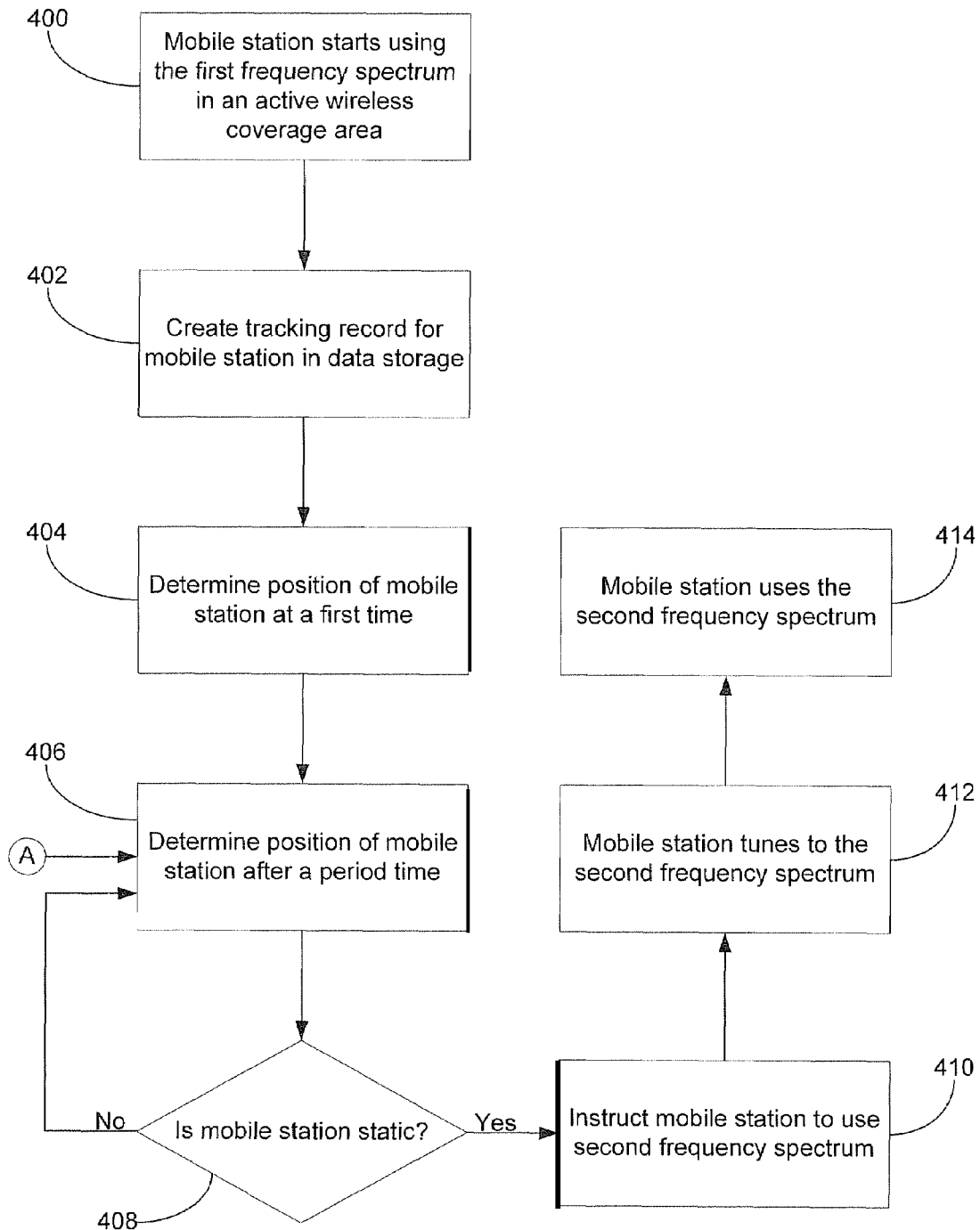
FIG. 4 is a flow chart illustrating a method of frequency usage, in accordance with an exemplary embodiment of the present invention.

FIG. 4 is a flow chart showing an exemplary method for using the first and second frequency spectrum shown in FIG. 3, in wireless telecommunications network 10 shown in FIG. 1 and with the configuration of wireless coverage areas shown in FIG. 2. As indicated by step 400, the process may begin when a mobile station, such as mobile station 22, starts using the first frequency spectrum in an "active" wireless coverage area, such as sector 112c. As used herein, an "active" wireless coverage area is one in which the BTS serving it is provisioned to use the second frequency spectrum, in addition to the first frequency spectrum, and the conditions, such as time of day, are met such that the second frequency spectrum is actually available for use in that wireless coverage area. In this regard, a wireless coverage may become active when a peak usage period begins and may cease being active when the peak usage period ends. The active wireless coverage areas may correspond to high-traffic wireless coverage areas, i.e., wireless coverage areas in which it is common for all of the traffic channels in the first frequency spectrum to be used during peak usage periods. In the example shown in FIG. 2, the active wireless coverage areas are sectors 112c, 114a, and 118b.

Step 400 may occur when a mobile station moves into, is handed off to, or powers up in the active wireless coverage area. Step 400 may also occur when the mobile station is operating in a wireless coverage area at a time when the wireless coverage area becomes active, for example, when a peak usage period begins.

As indicated by step 402, a network element, such as BSC 24, may then create in data storage 25 a tracking record for the mobile station. The tracking record preferably identifies the mobile station, such as by mobile identification number (MIN), mobile directory number (MDN), electronic serial number (ESN), or other identifier, and the active area in which the mobile station is operating. As described in more detail below, when information regarding the mobile station's position or speed becomes available, this information may be added to the tracking record in order to track the mobile station's mobility. Thus, a tracking record may include one or more entries of the mobile station's location and/or speed at various times.

Next, wireless telecommunications network 10 determines the mobile station's position, as indicated by step 404. The position determination may be mobile-based, network-based, or use a combination of mobile-based and network-based techniques. The communications between wireless telecommunications network 10 and the mobile station to determine the mobile station's position may conform to the specification "Position Determination Service Standard for Dual-Mode Spread Spectrum Systems," TIA/EIA/IS-801, dated Oct. 15, 1999, which is incorporated herein by reference. Other protocols may be used, however.

In a preferred embodiment, the mobile station is capable of determining its own position, such as by using the Global Positioning System (GPS) and/or Advanced Forward Link Triangulation (AFLT). For the GPS approach, the mobile station may use a GPS receiver to determine its position from signals transmitted from GPS satellites. For the AFLT approach, the mobile station determines its position from the round-trip delay associated with signals from multiple BTSs.

Thus, assuming that mobile station 22 can use either GPS or AFLT to determine its position in the example illustrated in FIG. 2, BSC 24 may cause BTS 12 to transmit a location request message to mobile station 22. In response, mobile station 22 determines its position, such as by using UPS and/or AFLT, and transmits to BTS 12 a location response message with information regarding its position. At this point, mobile station 22 is using the first frequency spectrum, so the location request message may be transmitted over one of paging channels 208 and the location response message may be transmitted over one of access channels 212. Alternatively, traffic channels, such as one of forward traffic channels 210 and one of reverse traffic channels 214, may be used for these communications.

BSC 24 calculates the position of mobile station 22, such as in terms of latitude and longitude, from the information contained in the location response message. BSC 24 may then add the calculated position to the mobile station's tracking record in data storage 25 along with a timestamp indicating when mobile station 22 was at the position.

Network 10 determines the position of mobile station 22 again after a period of time, as indicated by step 406, in order to determine the mobile station's speed. The time difference between position determinations may depend on a number of factors. For example, the time difference used between the first two position determinations may be different than the time difference used for subsequent position determination. Thus, in an exemplary embodiment, a time difference of about 5 minutes may be used between the first two position determinations and a time difference of about 2 minutes may be used between subsequent position determinations. In general, however, the time differences used by network 10 between position determinations may be optimized for different wireless coverage areas and may vary depending on the traffic load, time of day, and/or other factors.

The position determinations in step 406 may be accomplished similarly as in step 404. Thus, BSC 24 may again cause BTS 12 to transmit a location request message to mobile station 22. Mobile station 22 responsively determines its position, e.g., by using UPS and/or AFLT, and transmits back to BSC 24, via BTS 12, a location response message with position information. BSC 24 then calculates the new position of mobile station 22 from this information, and BSC 24 may store the new position with a timestamp in data storage 25 as part of the mobile station's tracking record.

A network element, such as BSC 24, then determines whether mobile station 22 is static or dynamic, as indicated by step 408. BSC 24 may make this determination by calculating the mobile station's speed, such as from the mobile station's two most recent positions and the time difference between them, i.e., the positions determined in steps 404 and 406 and stored in data storage 25 as part of the mobile station's tracking record. Alternatively, BSC 24 may use more than two data points to calculate the mobile station's speed, e.g., if the tracking record contains more than two position determinations.

If the calculated speed is sufficiently high, e.g., above a first threshold value, then BSC 24 may classify mobile station 22 as dynamic. If the calculated speed is below the first threshold value, then BSC 24 may classify the mobile station as static. BSC 24 may indicate in the mobile station's tracking record in data storage 25 whether mobile station 22 is currently static or dynamic. As described in more detail below, a "static" mobile station is one that is either stationary or moving slowly. A "dynamic" mobile station is one that is moving rapidly, such as may occur when it is located in a moving vehicle.

If mobile station 22 is dynamic, then mobile station 22 continues using the first frequency spectrum and network 10 determines the mobile station's position again after a period of time, i.e., goes back to step 406. However, if mobile station 22 is static, then a network element, such as BSC 24, may instruct mobile station 22 to begin using the second frequency spectrum, as indicated by step 410. For example, BSC 24 may send mobile station 22, via BTS 12, an IS-95 or IS-2000 Channel Assignment message instructing mobile station 22 to use a CDMA Frequency Assignment corresponding to the second frequency spectrum. BTS 12 may transmit the Channel Assignment message using one of paging channels 208 in first downlink frequency band 200.

In certain instances, however, network 10 may choose not to instruct the mobile station to begin using the second frequency spectrum, even though the mobile station is static. This may occur, for example, if the mobile station is engaged in a call or if there is insufficient wireless capacity in the second frequency spectrum.

In response to the instruction of step 410, mobile station 22 tunes to the second frequency spectrum, as indicated by step 412. Thereafter, mobile station 22 uses the second frequency spectrum to transmit and receive, as indicated by step 414. In particular, mobile station 22 monitors paging channels 308 in second downlink frequency band 300 and may receive transmissions over these channels. Similarly, mobile station 22 may use access channels 312 of second uplink frequency band 302 to originate transmissions. If mobile station 22 originates or receives a call, network 10 may instruct mobile station 22 to use forward traffic channels 310 and reverse traffic channels 314.

The first threshold speed that network 10 uses to classify mobile stations as either static or dynamic may be chosen in such a way that a "static" mobile station is unlikely to move out of the active wireless coverage area before the next position determination is made. In this way, handoffs from the second frequency spectrum to the first frequency spectrum, which may lead to dropped calls, may be minimized. Thus, in an exemplary embodiment, a mobile station may be classified as "static" if its speed is less than about 5 miles per hour. In general, however, the first threshold speed used by network 10 may be optimized for different wireless coverage areas and may vary depending on the traffic load, time of day, and/or other factors.

Figure 5:
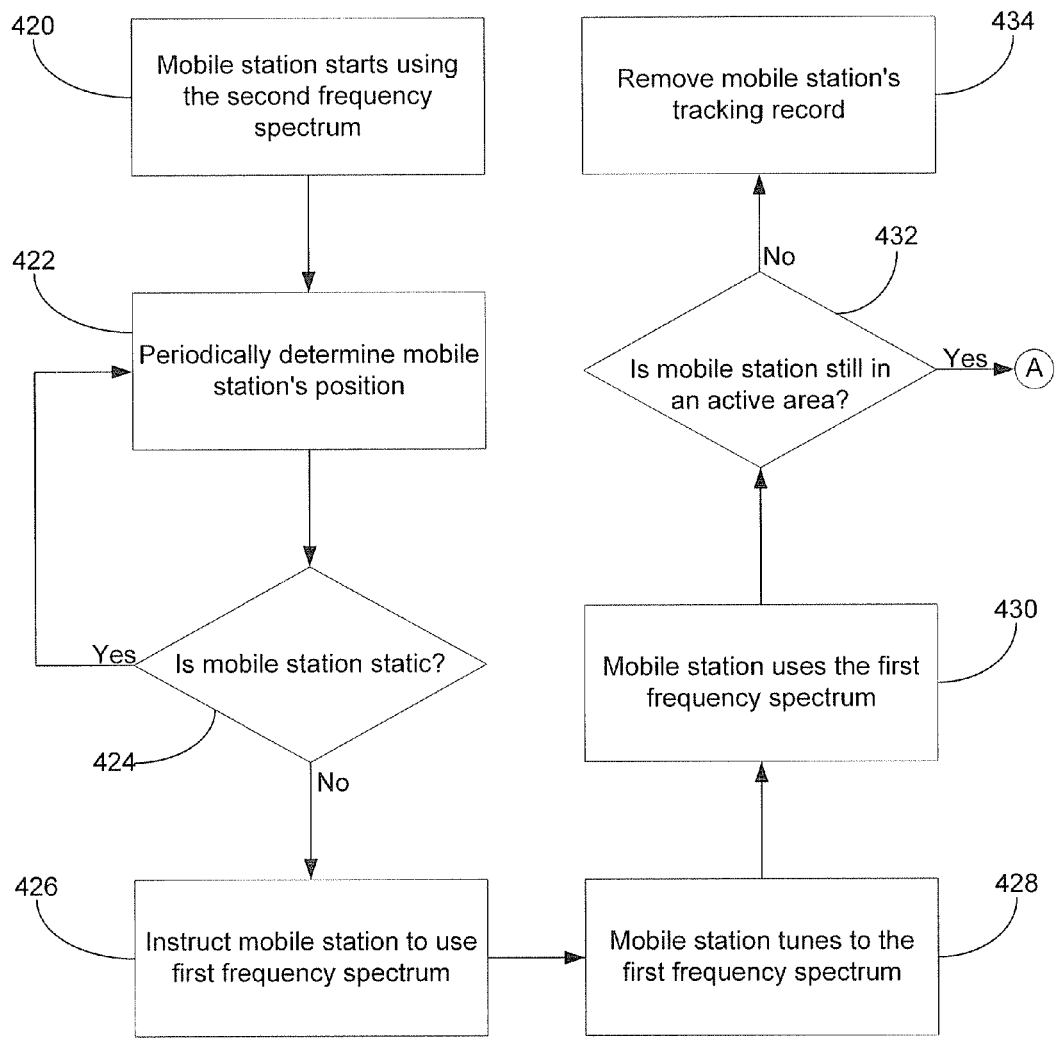
FIG. 5 is a flow chart further illustrating a method of frequency usage, in accordance with an exemplary embodiment of the present invention.

Network 10 may continue tracking the position of mobile station 22 after it has started using the second frequency spectrum, as illustrated in the flow chart of FIG. 5. As indicated by step 420, the process may begin when mobile station 22 starts using the second frequency spectrum. Mobile station 22 may, for example, begin using the second frequency spectrum in response to instructions from network 10, as described above.

As indicated by step 422, BSC 24, or other network element, continues monitoring the position of mobile station 22 at periodic time intervals. The process may occur in a manner similar to when mobile station 22 was using the first frequency spectrum, as described above, except that the location request messages and location response messages may occur in the second frequency spectrum, e.g., over paging channels 208 and access channels 312.

To determine whether mobile station 22 is static or dynamic, BSC 24, or other network element, calculates its speed from the positions determined for mobile station 22, as indicated by step 424. If the speed of mobile station 22 is below a second threshold value, then the mobile station remains classified as static. As a result, network 10 will continue to allow mobile station 22 to use the second frequency spectrum but will continue monitoring its position, i.e., go back to step 422. This second threshold value may be, but need not be, the same as the first threshold value used to classify the mobile station when it is using the first frequency spectrum.

If, however, mobile station 22 is now dynamic, i.e., its speed exceeds the second threshold value, then network 10 may instruct mobile station 22 to use the first frequency spectrum, as indicated by step 426. For example, BSC 24 may send the mobile station, via BTS 12, an IS-95 or IS-2000 Channel Assignment message that instructs the mobile station to use a CDMA Frequency Assignment corresponding to the first frequency spectrum. BTS 12 may transmit the Channel Assignment message, using paging channels 308 in the second downlink frequency band 300.

Network 10 need not instruct mobile station 22 to use the first frequency spectrum in every case it becomes dynamic, however. In particular, if mobile station 22 is engaged in a call or if there is not enough wireless capacity in the first frequency spectrum, then network 10 may allow mobile station 22 to continue using the second frequency spectrum.

Assuming that mobile station 22 is instructed to use the first frequency spectrum, then mobile station 22 responsively tunes to the first frequency spectrum, as indicated in step 428. Thereafter, mobile station 22 uses the first frequency spectrum, as indicated in step 430, such as by monitoring paging channels 208, receiving transmissions over paging channels 208, and/or originating transmissions over access channels 212. Similarly, if engaged in a call, mobile station 22 would use forward traffic channels 210 and reverse traffic channels 214.

Network 10 may also determine, e.g., based on its position determinations, whether mobile station 22 is still in an active wireless coverage area, as indicated by step 432. If mobile station 22 is still located in sector 112c, or if it has moved to another active wireless coverage area, such as sector 114a or sector 118b, then network 10 may continue monitoring the position of mobile station 22, as indicated by step 406 of FIG. 4. If, however, mobile station 22 moves to a wireless coverage area in which the second frequency is not available, such as sector 112b, then network 10 may remove its tracking record from data storage 25, as indicated by step 434.

Although in a preferred embodiment, the positions of mobile stations, such as mobile station 22, are determined when they begin using the first frequency spectrum in active wireless coverage areas and at periodic times thereafter, the position determinations may also be made at other times. For example, rather than make a position determination as soon as a mobile station begins using the first frequency spectrum in an active wireless coverage area, network 10 may wait for other conditions to be met or circumstances to occur before making a position determination.

Additionally, although network 10 may calculate the speed of mobile stations from position determinations separated in time, as described above, network 10 may determine the speed of mobile stations in other ways. For example, the GPS receivers in some mobile stations may be able to use the signals from GPS satellites to determine the mobile station's speed and direction of motion, in addition to the mobile station's position. Thus, in some embodiments a mobile station's speed may be determined from one measurement, rather than from two or more position measurements separated in time.

3. Exemplary Advantages

In accordance with the preferred embodiments described above, the present invention may be used to increase the wireless capacities of one or more wireless coverage areas by making a second frequency spectrum available for use in those wireless coverage areas, at least during certain periods of time. Thus, one may identify the high-traffic wireless coverage areas in the wireless telecommunications network, and one may increase the wireless capacities of the high-traffic wireless coverage areas by making the second frequency spectrum available in the high-traffic areas without also making the second frequency spectrum available in the surrounding areas. The possibility of hard handoffs from the second to the first frequency spectrum may be minimized by using the second frequency spectrum for only the static mobile stations in the high-traffic areas. In particular, a static mobile station is unlikely to move out of the high-traffic areas so as to require a hard inter-frequency handoff. Moreover, adding the second frequency spectrum to only the high-traffic areas that need the additional wireless capacity, i.e., without also adding the second frequency spectrum to surrounding areas, may reduce the costs associated with making the second frequency spectrum available.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of frequency usage in a wireless telecommunications network, said wireless telecommunications network including a transceiver system providing a wireless coverage area, said transceiver system being able to use at least a first frequency spectrum and a second frequency spectrum for communications with mobile stations located in said wireless coverage area, said second frequency spectrum being different than said first frequency spectrum, said method comprising:

determining a speed of a mobile station by determining at least a first position of said mobile station at a first time and a second position of said mobile station at a second time; and if said speed is below a first threshold value, said wireless telecommunications network instructing said mobile station to use said second frequency spectrum.

2. The method of claim 1, wherein said first frequency spectrum includes a first uplink frequency band and a first downlink frequency band and said second frequency spectrum includes a second uplink frequency band and a second downlink frequency band.

3. The method of claim 2, wherein said first uplink frequency band does not overlap said second uplink frequency band and said first downlink frequency band does not overlap said second downlink frequency band.

4. The method of claim 2, further comprising:

said mobile station responsively using said second frequency spectrum in said wireless coverage area.

5. The method of claim 4, wherein said mobile station using said second frequency spectrum in said wireless coverage area includes said mobile station monitoring a paging channel in said second downlink frequency band.

6. The method of claim 4, wherein said mobile station using said second frequency spectrum in said wireless coverage area includes said mobile station receiving a transmission from said transceiver system over a paging channel in said second downlink frequency band.

7. The method of claim 4, wherein said mobile station using said second frequency spectrum in said wireless coverage area includes said mobile station transmitting a message to said transceiver system over an access channel in said second uplink frequency band.

8. The method of claim 4, wherein said mobile station using said second frequency spectrum in said wireless coverage area includes said mobile station receiving transmissions from said transceiver system over a forward traffic channel in said second downlink frequency band and transmitting to said transceiver system over a reverse traffic channel in said second uplink frequency band.

9. The method of claim 4, wherein said wireless telecommunications network instructing said mobile station to use said second frequency spectrum comprises:
said transceiver system transmitting a message to said mobile station over a paging channel in said first downlink frequency band.

10. The method of claim 9, further comprising:
if said speed is above a second threshold value, said wireless telecommunications network instructing said mobile station to use said first frequency spectrum; and
said mobile station using said first frequency spectrum in said wireless coverage area.

11. The method of claim 10, wherein said wireless telecommunications network instructing said mobile station to use said first frequency spectrum comprises:
said transceiver system transmitting a message to said mobile station over a paging channel in said second downlink frequency band.

12. The method of claim 1, wherein determining a speed of a mobile station by determining at least a first position of said mobile station at a first time and a second position of said mobile station at a second time comprises:
said wireless telecommunications network transmitting a first location request to said mobile station;
said mobile station responsively transmitting a first location response, said first location response containing a first position of said mobile station at a first time;
said wireless telecommunications network transmitting a second location request to said mobile station; and
said mobile station responsively transmitting a second location response, said second location response containing a second position of said mobile station at a second time.

13. The method of claim 1, wherein said wireless telecommunications network determines a speed of said mobile station when said mobile station enters said wireless coverage area.

14. The method of claim 1, wherein said wireless telecommunications network determines a speed of said mobile station at periodic time intervals.

15. The method of claim 1, wherein said transceiver system includes a base transceiver station (BTS).

16. The method of claim 1, wherein said transceiver system and said mobile station communicate over a code division multiple access (CDMA) air interface.

17. A system for controlling frequency usage in a wireless telecommunications network, said system comprising:
a transceiver system for wirelessly communicating with mobile stations located in a wireless coverage area, said transceiver system using a first frequency spectrum for communications with dynamic mobile stations, said transceiver system using a second frequency spectrum for communications with static mobile stations;
data storage containing tracking records for mobile stations located in said wireless coverage area, wherein at least one of said tracking records includes at least a first position at a first time of at least one mobile station and a second position at a second time of said at least one mobile station; and
a controller for controlling said transceiver system, said controller classifying mobile stations as static or dynamic based on said tracking records.

18. The system of claim 17, wherein said transceiver system includes a base transceiver station (BTS).

19. The system of claim 17, wherein said controller includes a base station controller (BSC).

* * * * *